(12) United States Patent
Klaghofer et al.

(10) Patent No.: US 7,752,319 B2
(45) Date of Patent: Jul. 6, 2010

(54) METHOD AND DEVICE FOR IMPLEMENTATION OF A FIREWALL APPLICATION FOR COMMUNICATION DATA

(75) Inventors: Karl Klaghofer, München (DE); Harald Müller, Gilching (DE); Jürgen Totzke, Poing (DE); Gerald Volkmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 1241 days.

(21) Appl. No.: 10/490,574

(22) PCT Filed: Sep. 10, 2002

(86) PCT No.: PCT/DE02/03351

§ 371 (c)(1),
(2), (4) Date: Mar. 19, 2004

(87) PCT Pub. No.: WO03/028334

PCT Pub. Date: Apr. 3, 2003

(65) Prior Publication Data

US 2004/0255035 A1 Dec. 16, 2004

(30) Foreign Application Priority Data

Sep. 25, 2001 (DE) ................ 101 47 147

(51) Int. Cl.
*G06F 15/16* (2006.01)
(52) U.S. Cl. .................. 709/229; 709/227
(58) Field of Classification Search .......... 709/227, 709/229
See application file for complete search history.

(56) References Cited

U.S. PATENT DOCUMENTS

| 6,195,366 | B1 | 2/2001 | Kayashima et al. | |
| 6,212,192 | B1* | 4/2001 | Mirashrafi et al. | 370/401 |
| 6,332,163 | B1* | 12/2001 | Bowman-Amuah | 709/231 |
| 6,606,660 | B1* | 8/2003 | Bowman-Amuah | 709/227 |
| 2002/0120755 | A1* | 8/2002 | Gomes et al. | 709/229 |
| 2002/0133716 | A1* | 9/2002 | Harif | 713/201 |
| 2003/0055990 | A1* | 3/2003 | Cheline et al. | 709/229 |
| 2004/0037268 | A1* | 2/2004 | Read | 370/352 |
| 2004/0139178 | A1* | 7/2004 | Mendez et al. | 709/220 |

(Continued)

FOREIGN PATENT DOCUMENTS

EP    0 964 560 A1    12/1999

(Continued)

OTHER PUBLICATIONS

Martin Euchner, "Introduction to Information Security and its application to Multimedia Security", Universität Klagenfurt—IWAS, Multimedia Kommunikation, Munich, Germany, Siemens AG, Information & Communications, May 2001, pp. 1-60.

(Continued)

*Primary Examiner*—Nathan Flynn
*Assistant Examiner*—Mohamed Wasel

(57) ABSTRACT

In one aspect a method for implementation of a firewall application is provided, whereby, in one step of the initiation of a connection from the first to the second terminal, authentication of the first terminal is transmitted and, after successful authentication a selected address is communicated to the firewall device. In another aspect, an arrangement for carrying out the method is provided.

19 Claims, 1 Drawing Sheet

U.S. PATENT DOCUMENTS

| | | | |
|---|---|---|---|
| 2005/0125532 A1* | 6/2005 | Kimchi | 709/225 |
| 2006/0112424 A1* | 5/2006 | Coley et al. | 726/11 |
| 2006/0277314 A1* | 12/2006 | Hesselink et al. | 709/229 |
| 2008/0016559 A1* | 1/2008 | Cornelius et al. | 726/11 |

FOREIGN PATENT DOCUMENTS

| | | |
|---|---|---|
| WO | WO 01/30036 A1 | 4/2001 |

OTHER PUBLICATIONS

Nikolaos Anerousis, R. Gopalakrishnan, Charles R. Kalmanek, Alan E. Kaplan, William T. Marshall, Partho P. Mishra, Peter Z. Onufryk, K.K. Ramakrishnan and Cormac J. Sreenan, "Tops: An Architecture for Telephony over Packet Networks", IEEE Journal on Selected Areas in Communications, vol. 17, No. 1, Jan. 1999, pp. 91-108.

Christian Wietfeld, Ulrich Gremmelmaier, Seamless IP-based Service Integration across Fixed/Mobile and Corporate/Public Networks, Vehicular Technology Conference, 1999 IEEE. 49th Houston, TX, USA, pp. 1930-1934.

\* cited by examiner

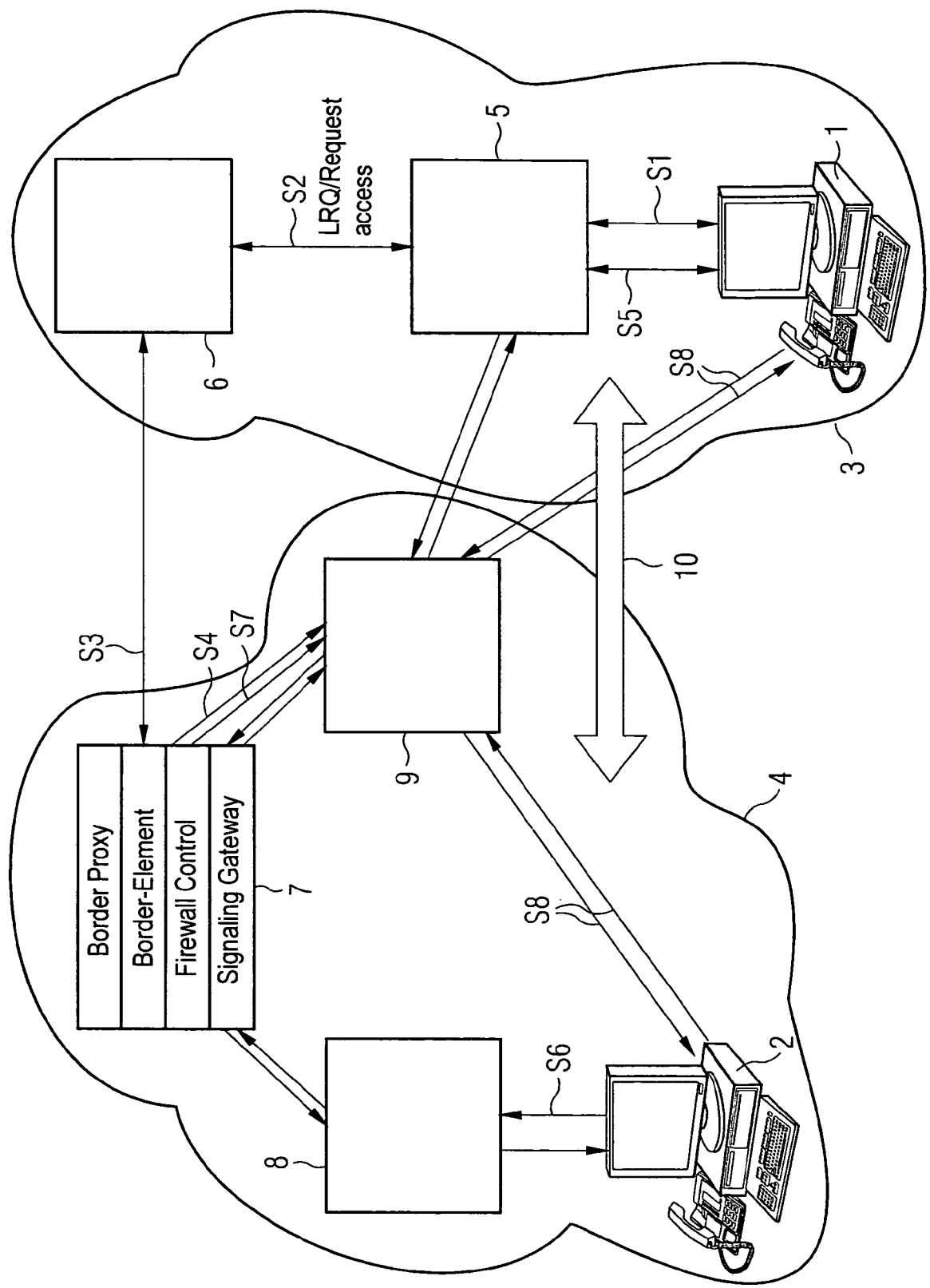

METHOD AND DEVICE FOR IMPLEMENTATION OF A FIREWALL APPLICATION FOR COMMUNICATION DATA

CROSS REFERENCE TO RELATED APPLICATIONS

This application is the US National Stage of International Application No. PCT/DE02/03351, filed Sep. 10, 2002 and claims the benefit thereof. The International Application claims the benefits of German application No. 10147147.5 DE filed Sep. 25, 2001, both of the applications are incorporated by reference herein in their entirety.

FIELD OF INVENTION

The invention relates to a method for implementing a firewall application for communication data transmitted between terminal devices according to the preamble of claim 1 and an arrangement for performing the method.

BACKGROUND OF INVENTION

Methods for security checking of transmitted communication data are often referred to as "firewalls". These are methods and devices which are aimed at preventing unauthorized access to data and in particular at preventing the introduction of computer viruses.

Firewalls are frequently deployed at the boundaries of two adjacent communication networks in order to preclude from the outset the infiltration of computer viruses into, for example, a private communication network of the "LAN" type (LAN: Local Area Network). Firewalls of this kind have the disadvantage that they cannot process communication data which is transmitted in the context of Internet telephony, based on the Voice-over-IP principle, between two terminal devices disposed in different communication networks on account of a dynamically assigned address of the terminal devices involved. Accordingly the transmitted communication data is not reliably checked with regard to its content for the presence of computer viruses.

In Internet telephony, IP addresses are assigned only temporarily, in other words dynamically, by the Internet Service Providers (ISPs), which is why the IP addresses must be exchanged first before a connection is established via the Internet. However, a firewall device disposed between the communication networks is usually designed to recognize static IP addresses, in other words addresses which do not change temporarily.

International standards, specifically the H.323 or SIP standard, were created in order to enable video and audio data to be detected, transmitted and processed further in the context of Internet telephony or a multimedia conference via the Internet. This standard uses the protocols known from the Internet, such as UDP (User Data Protocol) and RTP (Real-Time Protocol). These protocols are used to transport datagrams by means of which the audio and video data is transmitted over the Internet.

Specified among other things in this standard is that telephone calls based on Voice-over-IP may consist of a number of connections, specifically the signaling, control protocol and user data connections. For these connections, the port numbers, which may only be valid for the duration of a single call, must be re-determined for each further call. These dynamically determined port numbers lead to further problems in the processing of the data by the firewall device, which is usually geared to the recognition of statically determined port numbers.

SUMMARY OF INVENTION

Accordingly the object of the present invention is to provide a method for implementing a firewall application for communication data transmitted between communication networks also for Internet telephony and Internet multimedia connections, and an arrangement for performing said method.

This object is achieved in respect of the method and the device according to the features of independent claims.

A significant point of the invention is that by means of what is called a look-ahead mechanism, prior to the actual connection setup between two terminal devices, a security check by a network interworking device whose IP address is known takes place in order subsequently, following a successful check, to activate a firewall device for the connection setup. For this purpose, in a first step to initiate a connection from the first to the second terminal device, authentication data for authentication of the first terminal device is sent via a first network interworking device to a second network interworking device which is disposed in the second communication network. In a second step, following successful authentication of the first terminal device, the network interworking device activates the firewall device for a selected further IP address of the signaling data of the authenticated terminal device or a gatekeeper.

In this way the firewall device can also recognize IP addresses for the setting up of a multimedia connection or an Internet telephone connection which are assigned on a time-limited basis. A security check of the data transmitted for these connections is therefore possible by means of a firewall device which constantly resets itself. Furthermore, as well as the agreement on a new IP address, the firewall device can also be set to and activated for new port numbers.

For the purpose of the ensuing connection setup, in a step involving the transmission of a message from the second to the first network interworking device, the new address is communicated for the transmission of signaling data. The first network interworking device then communicates the new address to a first gatekeeper.

Following this, a connection setup request can be signaled by the first terminal device via a first gatekeeper and the firewall device of the second network interworking device. The signaling data is checked for viruses by the firewall device and if verified as being in a virus-free state, is then forwarded to the second terminal device. Following successful agreement between the two terminal devices and a confirmation message from the second to the first terminal device for the acceptance of the call, an activation message for enabling the firewall device for user data of the first and second terminal device is sent from the second network interworking device to the firewall device. In this way the corresponding port numbers are activated at the firewall device for the transmission of user data, such as, for example, voice data.

A dynamic adaptation of the firewall device to the individual call is also assured during the self-adjustment to new port numbers.

Advantageously, in an arrangement for performing the method with the firewall device, the first and second terminal device and the first network interworking device, a second network interworking device is disposed with a known address for carrying out an authentication on the basis of authentication data transmitted by the first terminal device and for sending a selected further address of the first terminal device to the firewall device for activating said device for the signaling data to be sent from the first to the second terminal device.

The arrangement additionally comprises, preferably in the second network interworking device, an activation device for activating the firewall device for signaling data and/or user data. Following the activation of the ports responsible for the signaling data, the ports responsible for the user data are activated.

BRIEF DESCRIPTION OF DRAWING

Further advantageous embodiments are derived from the subclaims. In addition, advantages and beneficial uses can be derived from the following description in connection with the FIGURE. The latter shows a schematic representation of an embodiment of the method according to the invention with device aspects.

DETAILED DESCRIPTION OF INVENTION

The embodiment shown in the FIGURE represents in schematic form with reference to individual device aspects an Internet telephone call, based on the Voice-over-IP principle, between two communication networks, in each of which there is disposed a terminal device. The user of a first terminal device 1 would like to conduct an Internet telephone call with the user of a second terminal device 2. The first terminal device 1 is disposed in a first communication network 3, which represents a Voice-over-IP carrier network 3, while the second terminal device 2 is disposed in a local area network (LAN) 4.

In the steps S1, S2 and S3, a connection setup request is sent by the first terminal device 1 via a gatekeeper 5 and a first network interworking device 6 for the purpose of initiating a connection to a second network interworking device 7. A look-ahead mechanism of this kind between the first terminal device 1, the first gatekeeper 5 and the first network interworking device 6 in the first communication network 3 on the one side and the second network interworking device 7 in the second communication network 4 on the other side is effected according to an H.225.0 Annex G standard, the associated protocol of which takes into account the known port numbers.

During this connection initiation period, authentication data to authenticate the first terminal device is sent with or without prompting by the first terminal device to the second network interworking device 7 in order thereby to enable a check to be made on the user calling from outside the LAN, said user using the first terminal device. The exclusion of calling terminal devices which are not authorized is performed here according to various previously stored criteria.

Provided the identity of the calling terminal device was successfully established and its authorization to conduct an Internet call with devices inside the second communication network 4 is present, in step S4 a message containing a second address of the signaling data of the first terminal device or the first gatekeeper 5 is sent by the network interworking device 7 to a firewall device 9 in order to activate the firewall device 9 for this newly to be assigned address. The sending of a message of this type is initiated by a Firewall Control Interface (FCI) disposed in the second network interworking device 7.

Following successful authentication, an Access Confirm message is sent by the second network interworking device 7 by means of the H.225.0 Annex G protocol to the first network interworking device 6 and on to the first gatekeeper 5, by means of which Access Confirm message the IP address of, for example, the second network interworking device 7 and the port numbers assigned to the future call are communicated. The sending of an Access Confirm message of this kind from the second to the first network interworking device 6 can likewise take place prior to the step of sending the message from the second network interworking device 7 to the firewall device 9, by means of which message the newly assigned address is communicated to the firewall device.

In the following step S5, the actual setup of the call from the first to the second terminal device is performed via the first gatekeeper 5, the firewall device 9, the network interworking device 7 and the second gatekeeper 8. For this purpose, a SETUP mess age is sent by the first terminal device 1 to the second terminal device 2 according to the H.225.0 standard. The SETUP message is routed via a signaling gateway which is set up as a function within the second network interworking device (border proxy) in order to ensure that the signaling data is converted to the requirements of the new communication network 4 for the data. This SETUP message can pass the firewall device 9 because the corresponding ports were activated in step S4.

In a step S6, a confirmation message is sent in the form of an ALERT message for a completed connection setup to the second terminal device by the second terminal device via the second network interworking device 7, the firewall device 9 and the gatekeeper 5 to the first terminal device 1. In a step 7, the FCI disposed in the second network interworking device 7 then sends an activation signal to the firewall device 9, by means of which activation signal the corresponding port numbers open in order to receive future user data (voice data) for the first and the second terminal device. Voice data can now be transmitted from the first terminal device 1 to the second terminal device 2 via the firewall device 9 (step S8).

The transmission of the authentication data in steps S1-S3 can be based on a PKI encryption method (PKI: Private/Public Key Interface) which makes it virtually impossible for another external user who is not authorized to masquerade as an authorized user.

As an alternative to the H.323 and H.225 Annex G protocols use d, SIP protocols can be used for performing the method according to the invention. In this protocol the H.225.0 SETUP call setup message is replaced by the SIP INVITE message. Any other suitable protocol, in particular to replace the H.225.0 Annex G protocol, is also possible.

The functions FCI and checking of the authentication data (border element) can be disposed either within a network interworking device (border proxy) together with the second gatekeeper 8 on a common computer or independently of them in separate devices.

The method according to the invention can be implemented between a private network (LAN) and a carrier network, between two private networks or between two carrier networks. In addition to Internet telephony, its application to multimedia Internet connections is also possible.

The embodiment of the invention is not restricted to the example described and aspects highlighted above, but within the frame of reference of the claims is equally possible in a plurality of variations which lie within the scope of action by persons skilled in the art.

The invention claimed is:

1. A method for implementing a firewall application for communication data transmitted between terminal devices, comprising:

disposing a first terminal device and a first interworking device in a first communication network;

disposing a second terminal device and a second interworking device in a second communication network;
initiating a data connection between the first terminal device and the second terminal device;
sending data for authenticating the first terminal device from a first interworking device to a second interworking device with a known address;
authenticating, by the second interworking device, that the first terminal is authorized to communicate with the second communication network; and
in response to the first terminal being authorized:
communicating, by the second interworking device, a further address to a firewall device, the further address is selected from an address of the first terminal device and the address of a first gatekeeper connected to the first terminal device; and
activating the firewall device to allow signaling data to be sent by the first terminal device via the firewall device to the second terminal device.

2. The method according to claim 1, further comprising sending the further address from the second interworking device to the first interworking device.

3. The method according to claim 2, wherein the further address includes an IP address and a port number.

4. The method according to claim 2, further comprising sending a call setup up message from the first terminal device to the second terminal device via the first gatekeeper, the firewall device, the second interworking device and a second gatekeeper.

5. The method according to claim 4, wherein the call setup is performed by sending a SETUP message or an SIP INVITE message.

6. The method according to claim 4, further comprising a confirmation message to confirm the acceptance of the call setup is sent from the second terminal device to the first terminal device by including the further address in the confirmation message.

7. The method according to claim 1, further comprising sending from the second network device an activation message to the firewall device in order to activate the firewall device for user data.

8. The method according to claim 1, wherein the authentication data is transmitted using a Private/Public Key Interface (PKI) encryption.

9. The method according to claim 1, wherein the communication data is transmitted via Internet telephony or Internet multimedia connections.

10. The method according to claim 2, wherein the authentication is based on the sent data and criteria stored in the second interworking device.

11. The method according to claim 4, wherein the first interworking device is bypassed in sending the call setup message.

12. The method according to claim 6, wherein the confirmation is embodied as an ALERT message.

13. A firewall arrangement for communication data transmitted between terminal devices, comprising:
a firewall device disposed between a first communication network and a second communication network;
a first terminal device disposed in the first communication network;
a second terminal device disposed in the second communication network;
a first interworking device disposed in the first communication network; and
a second interworking device with a known address for:
performing an authentication on the basis of authentication data transmitted by the first terminal device, wherein the authentication determines if the first terminal is authorized to communicate with the second communication network, and
sending, by the second interworking device, a further address of the second terminal device to the firewall device for activating the firewall device to allow signaling data to be sent from the first terminal device to the second terminal device via the firewall device, wherein the sending is in response to the first terminal being authorized to communication with the second communication network.

14. The firewall arrangement according to claim 13, wherein an activation device for activating the firewall device is used for signaling data and/or user data.

15. A method for implementing a firewall application for communication data transmitted between terminal devices, comprising:
disposing a first terminal device and a first interworking device in a first communication network;
disposing a second terminal device and a second interworking device in a second communication network;
receiving data by a second interworking device with a known address, the data for determining if the first terminal device is authorized to communicate with the second communication network;
activating, by the second interworking device, the firewall device to accept signaling data from the first terminal device, the activation via a firewall control interface and in response to the first terminal being authorized to communicate with the second communication network;
receiving signaling data from the first terminal device by the firewall device, the signaling data in the form of a call setup up message; and
accepting the signaling data by the firewall in response to the firewall being activated to accept the signaling data by the first terminal device.

16. The method according to claim 15, further comprising forwarding the call setup up message to the second terminal in response to the signaling data being accepted by the firewall.

17. The method according to claim 16, wherein a confirmation message is sent from the second terminal device to the first terminal device.

18. The method according to claim 17, further comprising activating the firewall device to accept user data from the first terminal device, the activation via the firewall control interface.

19. The method according to claim 18, further comprising:
receiving user data from the first terminal device by the firewall device; and accepting the user data by the firewall in response to the firewall being activated to accept the user data by the first terminal device.

* * * * *